Patented Oct. 14, 1952

2,614,101

UNITED STATES PATENT OFFICE 2,614,101

ACTIVATOR COMPOSITIONS AND THEIR USE IN EMULSION POLYMERIZATION

Carl A. Uraneck and Willard M. St. John, Borger, and Charles F. Fryling and James E. Troyan, Phillips, Tex., assignors to Phillips Petroleum Company, a corporation of Delaware No Drawing. Application December 31, 1948, Serial No. 68,720

20 Claims. (Cl. 260—94.3)

This invention relates to polymerization of conjugated diolefins in aqueous emulsion. In one embodiment it relates to preparing synthetic rubber by emulsion polymerization using a highly active and stable activator system.

In the production of rubber-like elastomers various polymerization recipes have been developed in order to provide polymers of superior physical properties. Variations in operating techniques have also been introduced in order to effect further improvements in the properties of the product. Recent developments have shown that synthetic elastomers having greatly improved properties may be obtained if polymerization reactions are effected at low temperatures. Since conversion rates generally decrease rapidly as the temperature is decreased, faster recipes are necessary in order that these reactions may be carried out on a practical basis. In order to accomplish the desired results at lower temperatures, a number of polymerization recipes have been provided. Outstanding among these are those in which a peroxide or hydroperoxide is a key component, and those in which a diazothioether is a key component. The peroxides and hydroperoxides are usually used in redox recipes, which include a combination of an oxidant, a reductant, and an oxidation catalyst. In this type of recipe the peroxide or hydroperoxide is the oxidant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like. As the oxidant in such a recipe, there may be used an inorganic peroxide, such as hydrogen peroxide, a pernitrate, a persulfate, a permanganate, or the like, or an organic peroxide such as benzoyl peroxide, or an organic hydroperoxide such as tertiary butyl hydroperoxide, methyl cyclohexyl hydroperoxide, or cumene hydroperoxide (more formally designated "dimethyl (phenyl) hydroperoxymethane"). In another type of recipe a diazothioether is the key component, and while it may be used alone, it is preferably used in combination with a water-soluble ferricyanide which is a salt of a monovalent cation, such as ammonium or an alkali metal. In all of these recipes, it is usually desirable to include a modifier, such as a mercaptan, and an emulsifying agent.

We have found that the oxidation catalyst used in such polymerization recipes is a very important part of the recipe, and that certain specific improvements in its preparation result in markedly increasing the rate of polymerization and frequently also favorably influence the characteristics of the reaction mixture. Usually this oxidation catalyst comprises a compound of a multivalent metal such as iron, manganese, copper, vanadium, cobalt, and the like, and most commonly is a water-soluble iron salt. The multivalent metal ion of such compounds can readily pass from a low valence state to a higher valence state, and vice versa. Sometimes the compound, when present in its lower valence state, can function in the dual role of reductant and oxidation catalyst.

One commonly used redox catalyst is iron pyrophosphate. In a redox system comprising hydrogen peroxide and organic mercaptan, used as oxidant and reductant respectively, ferric pyrophosphate, prepared by addition of a ferric salt to an aqueous solution of sodium pyrophosphate, has been found to be a useful catalyst. With another class of redox systems, comprising a cumene hydroperoxide and sugar, ferrous pyrophosphate has been found to be more effective as a catalyst, as is more fully discussed in Kolthoff application Serial No. 751,955, filed June 2, 1947. However, ferric pyrophosphate can also be used. When carrying out a polymerization with the ferrous system, certain difficulties are encountered. For example, if the catalyst is prepared in the form of a so-called "activator" solution by adding ferrous sulfate to an aqueous solution of sodium pyrophosphate, the solution must be used immediately, otherwise oxidation by the atmosphere destroys its potency. Impurities in the water, such as calcium salts, etc., likewise are deleterious. If the concentration of ferrous ion added to the system is greater than the concentration of cumene hydroperoxide, i. e., if there is present more than one gram, or milligram, ion of ferrous ion per gram, or milligram, molecule of cumene hydroperoxide, no polymerization occurs. The excess of cumene hydroperoxide required for optimum operating conditions over the mol ratio of one to one is so little that slight errors in measurement of these ingredients can easily cause great differences in the rate of polymerization and in the extent to which polymerization proceeds. However, it should be emphasized that if care is exercised in preparing the activator solution, consistent and high rates of polymerization can be obtained.

In preparing activator solutions, a ferrous or ferric salt is added to a solution of sodium pyrophosphate. Ferrous and ferric pyrophosphate are formed by metathesis and these compounds combine further to form pyrophosphate complexes, such as the well known soluble ferric pyrophosphate, $Fe_4(P_2O_7)_3 \cdot 3Na_4P_2O_7 \cdot xH_2O$. For this reason it has become customary to speak of ferrous pyrophosphate and ferric pyrophosphate activators without specifying the source of the ferrous or ferric ions, that is, whether derived from ferrous sulfate or some other salt, and without specifying to what extent the resulting pyrophosphates have been complexed. It can be mentioned that the aforementioned "soluble ferric pyrophosphate" has been found to be a very convenient source of ferric ions for the preparation of ferric activators.

With ferrous pyrophosphate, a molecular excess of cumene hydroperoxide with respect to ferrous ion must be present to obtain any polymerization. With ferric pyrophosphate, on the other hand, this limitation is absent and polymerization can be conducted with amounts of cumene hydroperoxide which are much lower than are required with an equivalent concentration of ferrous salt. However, under the best attainable conditions the rate of polymerization is never faster than about 67 per cent of what can be obtained with ferrous pyrophosphate. It might be thought that a mixture of ferrous and ferric salts would possess certain advantages and such indeed has been found to be the case. With such mixtures the limiting ratio of cumene hydroperoxide to iron can be lowered without adversely affecting the high rates of polymerization obtainable with ferrous pyrophosphate activation.

We have now found that, when an emulsion polymerization of a conjugated diolefin is carried out to produce synthetic rubber in a system containing an oxidant and an oxidation catalyst such as just discussed, surprising improvements are obtained in the polymerization rate, and also often fluidity of the resulting latex, when certain water soluble salts are incorporated in a particular manner in the activator solution which contains the oxidation catalyst. According to our invention, the activator solution is prepared by dissolving in water a salt of a multivalent metal such as previously discussed, a pyrophosphate of a monovalent cation, such as an alkali metal or ammonium, and a different salt of a monovalent cation and an anion which is inert with respect to the first named multivalent metal salt. This last compound is also preferably a salt of an alkali metal or ammonium, and the anion should neither tend to oxidize the multivalent metal ion when it is present in its lower valence state nor reduce it when it is present in its higher valence state nor precipitate it, when in either valence state, from aqueous solutions such as are commonly used in emulsion polymerization. We prefer to prepare the activator solution with the multivalent metal in its lower valence state, and in such instances the use of a separate reductant in the polymerization system is frequently unnecessary, particularly when operating at subfreezing polymerization temperature with an alcohol present in the aqueous medium. When the activator solution is prepared with a salt of a multivalent metal in its higher valence state it is usually necessary also to have a reductant, such as a reducing sugar, present while the solution is heated. If desired such a reductant may also be present when the multivalent metal is present in its lower valence state. The third salt which is added can be any one of a large number of salts which meet the foregoing requirements, and a salt of a monovalent ion which is a fluoride, chloride, nitrate, sulfate, phosphate, borate, tetraborate, formate, acetate, propionate, benzoate, tartrate, salicylate, citrate, and the like, is particularly preferred. In order to get our improved results to the greatest extent it is necessary to add the multivalent metal salt, pyrophosphate, and third salt to water and then to heat the resulting solution to a temperature between 40 and 100° C. The solution should be heated out of contact with free oxygen, as by boiling or heating in a nitrogen atmosphere, and subsequently kept from such contact. After cooling, it is then added to the reaction mixture as desired. As is illustrated by data in Examples VII and VIII, other methods of incorporating these ingredients in the reaction system are markedly less effective.

An object of this invention is to polymerize unsaturated organic compounds. Another object of this invention is to produce an improved synthetic rubber. Still another object of this invention is to increase the reaction rate in polymerizing unsaturated organic compounds in aqueous emulsion. An additional object of this invention is to produce a more fluid synthetic rubber latex when effecting emulsion polymerization at subfreezing temperatures. Still another object of this invention is to produce a more active activator solution for use in emulsion polymerization, where an oxidant is an essential ingredient of the polymerization mixture. Further objects and advantages of this invention will become apparent, to one skilled in the art, from the accompanying disclosure and discussion.

In effecting emulsion polymerization of a monomeric material, particularly when a batch-type or semibatch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solution and oxidant intermittently, or continuously, during the course of the reaction. If the operation is carried out continuously, streams of the various ingredients are admixed in somewhat the same order prior to their final introduction into the polymerization reaction zone.

The activator solution which is prepared in accordance with our invention is usually prepared entirely separately and somewhat prior to its use in the polymerization reaction. Each ingredient is dissolved in water in a concentration between about 0.1 and 10 parts by weight per 100 parts of water used for the activator solution. The three essential ingredients hereinbefore discussed are added to water and the resulting solution heated to a temperature between 40 and 100° C., preferably between 50 and 80° C., for a period of from 5 to 90 minutes, more usually from 30 to 60 minutes. This heating and subsequent handling of the solution should be done in the absence of free oxygen. If the solution is heated to boiling, the resulting steam is frequently sufficient to drive off any air, and free oxygen can thus be excluded from the activator system. If a lower temperature is used, it is frequently necessary to introduce a stream of an inert gas, such as nitrogen, over the surface of the liquid, and to maintain such an inert atmosphere in the vapor phase of any container in which the liquid is stored. In the majority of cases, the salt of the multivalent metal and the pyrophosphate are present in an amount ranging from 0.8 to 1.2 mols with respect to one mol of the other, and the resulting activator solution and oxidant are subsequently added to the polymerization zone in amounts so that the relative amounts of these materials are within the same range. It is usually preferred that the amounts of multivalent metal ion and pyrophosphate be present in equimolar quantities, and the amount of oxidant be in excess of the molecular equivalent of the multivalent metal and pyrophosphate. We prefer to see to it that the strength of our activator solution is so regulated, and the amount of the activator solution added is so regulated, that there is added to the reaction mixture from 0.01 to 3 millimol parts of multivalent metal and pyrophosphate and oxidant per 100 parts by weight of monomeric material, with the preferred quantities being in the range from 0.1 to 0.65 millimol parts by weight of multivalent metal. The amount of the third salt added is between 0.1 and 5 parts per 100 parts of monomeric material, and often is not more than 0.5 part. In considering the amounts of these materials, the same units of weight should be used. That is, if the monomeric material is measured in pounds, these other materials are measured in millipound mols.

As previously stated, it is usually desirable that the multivalent metal be present in its lower valence state. With some recipes, it is unnecessary to include an organic reducing agent either in the activator solution or in the polymerization mixture. However, particularly at temperatures above 0° C., a faster reaction is sometimes obtained with some recipes when a small amount of an organic reducing agent, such as a reducing sugar, is included in the polymerization recipe, and it is frequently more desirable to incorporate this in the reaction system by first including it in the activator solution along with the other ingredients. When the multivalent ion is present in its higher valence state, it is usually necessary to include in the activator solution an organic reducing agent. As a result the multivalent ion will be partially reduced and a substantial amount of the multivalent ion will be present in its lower valence state when the activator solution is ready for addition to the polymerization mixture.

It is usually preferred that the multivalent ion be iron, and the activator solution may be prepared from any of the readily available soluble iron salts, such as ferrous sulfate, ferric sulfate, ferrous nitrate, and the like. A pyrophosphate of sodium or potassium is also usually used in preparing the activator solution. Apparently the ferrous salt and the pyrophosphate inter-react to form some kind of a complex compound, and it may be that the third salt, which we include in the activator solution prior to being heated, influence in some way the composition or molecular structure of the resulting complex. Previous experience with the preferred types of recipes has indicated that it is necessary to incorporate at least 0.3 part by weight of iron salt in the reaction mixture per 100 parts of monomers in order to obtain satisfactory reaction rates and conversions. This corresponds to at least about 1.1 millimol parts of iron per 100 parts of monomers charged to the reaction system. We have discovered that when the activator solution is prepared as disclosed herein, satisfactory results can be obtained with an amount of iron no greater than 0.2 millimol parts per 100 parts of monomers charged. As a result, the final polymer product contains a substantially lower quantity of iron, which is distinctly desirable insofar as the properties of the resulting rubber product are concerned. This is particularly true when a salt such as potassium chloride or sodium fluoride is included in preparing the activator system in the manner described.

One point of major concern when carrying out emulsion polymerization reactions at low temperatures, particularly at subfreezing temperatures, is that of having the latex become very viscous, or even set up to form a gel. An additional advantage which results from the use of our invention, and which results particularly when the salt added to the activator system is potassium chloride or a fluoride or a tetraborate, is that the resulting latex produced when the activator solution is used is highly fluid and free from gelation tendencies. Gelation of the latex, precoagulation, and skin formation during polymerization, which are frequently severe, are prevented when operating in the manner described with these two classes of salts. Since the polymerization reaction is exothermic and it is necessary to both agitate the solution to maintain adequate emulsification and to aid contact with cooling surfaces to remove heat of reaction, this production of a highly fluid latex makes agitation much easier, and aids in maintaining a more uniform temperature during the reaction, as well as producing a latex which can be easily handled in subsequent process steps.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3 - furyl-1,3-butadiene, 3-methoxy-1,3-butadiene and the like; haloprenes, such as chloroprene (2-chloro-1,3-butadiene), bromoprene methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloro-acrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 180 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more of the alcohol present be in the aqueous phase. A high-boiling alcohol such as glycerine is difficult to recover from the resulting serum; a low-boiling alcohol such as methanol is easily removed and frequently preferred. Other low-boiling alcohols such as ethanol, however, are frequently too soluble in the liquid monomeric material to permit satisfactory operation. If the resulting latex tends to gel at low reaction temperatures, a larger proportion of aqueous phase should be used. It is generally preferred that the emulsion be of an "oil in water" type, with the ratio of aqueous medium to monomeric material between about 1.5:1 and about 2.75:1, in parts by weight. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase.

Emulsifying agents which are applicable in these low temperature polymerizations are materials such as potassium laurate, potassium oleate, and the like. However, other emulsifying agents, such as non-ionic emulsifying agents, salts of alkyl aromatic sulfonic acids, salts of alkyl sulfates, and the like which will produce favorable results under the conditions of the reaction, can also be used in practicing the invention.

The pH of the aqueous phase may be varied over a rather wide range without producing deleterious effects on the conversion rate or the properties of the polymer. In general the pH may be within the range of 9.0 to 11.8, with the narrower range of 9.5 to 10.5 being most generally preferred.

The mercaptans applicable in this invention are usually alkyl mercaptans, and these may be of primary, secondary, or tertiary configuration, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 1 part per 100 parts of monomers may be used. Thus the amount of mercaptan is adjusted to suit the case at hand.

Temperatures applicable for the operation of this invention may range from $-40$ to $+70°$ C., with the range $-20$ to $+5°$ C. being preferred.

Our new activator solutions can be used to advantage in systems wherein the oxidizing agent is a peroxidic-type material, or a compound which functions in the capacity of an oxidizing agent, such as a diazothioether which is soluble in a liquid hydrocarbon material, such as liquid butadiene. We prefer to use organic peroxides and hydroperoxides, such as may be represented by the formula R'OOR", where R' may be an alkyl, aryl, aralkyl, or cycloalkyl group, and R" may be hydrogen or an alkyl, aryl, aralkyl, or cycloalkyl group. Specific examples of these compounds include benzoyl peroxide, tertiary butyl hydroperoxide, cumene hydroperoxide, (phenyldimethyl methyl hydroperoxide), and methyl cyclohexane hydroperoxide. Preferred diazothioethers include 2-(4-methoxybenzene diazothiomercapto)-naphthalene, 1-(2,4-dimethylbenzene diazomercapto)-naphthalene, and the like.

Advantages of this invention are illustrated by the following examples. The reactants, and their proportions, and the other specific ingredients of the recipes are presented as being typical and should not be construed to limit the invention unduly.

Example I

Butadiene and styrene were copolymerized, using the following recipe:

| | Parts by weight |
|---|---|
| Butadiene | 70 |
| Styrene | 30 |
| Water (including that in activator) | 180 |
| Methanol | 40 |
| Potassium laurate (95% neutralized) | 5.0 |
| Mercaptan blend[1] | 0.12 |
| Cumene hydroperoxide (100%) | 0.17 (1.1 millimols) |
| Activator solution[2] | 25 ml. |
| Ferrous sulfate ($FeSO_4 \cdot 7H_2O$) | 0.31 (1.1 millimols) |
| Sodium pyrophosphate ($Na_4P_2O_7 \cdot 10H_2O$) | 0.56 (1.25 millimols) |
| Sodium fluoride | 0.14 (3.3 millimols) |

[1] A blend of tertiary $C_{12}$, $C_{14}$, and $C_{16}$ mercaptans in a ratio of 3:1:1 parts by weight.
[2] This solution was prepared by adding the three salts to water, in the proportions indicated, and heating the resulting solution to about 50° C. for 30 minutes, with the exclusion of air. The solution was then cooled out of contact with air.

Polymerization was effected at −10° C. for a period of 17.4 hours at which time a conversion of 84 per cent was reached. A substantially gel-free, fluid latex was produced.

A parallel run was made except that 0.70 part sodium pyrophosphate was employed and sodium fluoride was omitted. Conversion reached only 65 per cent in 17.4 hours and the latex was highly viscous.

Example II

Three parallel runs were made using the recipe and conditions given in Example I except that in preparing the activator solution, the amounts of sodium pyrophosphate and sodium fluoride were varied. In the following tabulation the amounts of each of these ingredients are shown, together with the conversion obtained in a 12.5-hour period using the resulting activator solutions.

| Run No. | $Na_4P_2O_7$, Parts | NaF, Parts | Conversion, Percent—12.5 Hours |
|---|---|---|---|
| 1 | 0.55 | | 53 |
| 2 | 0.55 | 0.14 | 72 |
| 3 | 0.70 | | 39 |

In run No. 2 the latex was fluid while in the other runs it was viscous. Similar results are produced when potassium fluoride is used in place of sodium fluoride.

These data show clearly the improved conversion rates obtained when using an activator system containing a soluble fluoride.

Example III

Butadiene and styrene were copolymerized using the follow recipe:

| | Parts by weight |
|---|---|
| Butadiene | 70 |
| Styrene | 30 |
| Water (including that in activator) | 150 |
| Methanol | 30 |
| Emulsifier[1] | 5.0 |
| Mercaptan blend[2] | 0.25 |
| Cumene hydroperoxide (44.7%) | 0.35 |
| Activator solution | 14 ml. |
| Ferrous sulfate, $FeSO_4 \cdot 7H_2O$ | 0.31 (1.1 millimols) |
| Sodium pyrophosphate, $Na_4P_2O_7 \cdot 10H_2O$ | 0.56 (1.25 millimols) |
| Sodium tetraborate, $Na_2B_4O_7 \cdot 5H_2O$ | 0.14 (0.48 millimol) |

[1] Lauric acid, 95 per cent neutralized with KOH.
[2] A blend of tertiary $C_{12}$, $C_{14}$, and $C_{16}$ aliphatic mercaptans in a ratio of 3:1:1 parts by weight.

The activator solution was prepared by heating a mixture of 2.2 grams $FeSO_4 \cdot 7H_2O$, 4.0 grams $Na_4P_2O_7 \cdot 10H_2O$, 1.0 gram $Na_2B_4O_7 \cdot 5H_2O$, and sufficient water to make 100 ml. for 40 minutes at 60° C. Polymerization was effected at −10° C. for a period of 15.5 hours at which time a conversion of 77.8 per cent was reached. A parallel run containing 0.70 part sodium pyrophosphate and no sodium tetraborate gave a conversion of 65.8 per cent in 15.5 hours.

In a third run the amounts of sodium pyrophosphate and sodium tetraborate were changed in the following way:

| | |
|---|---|
| $Na_4P_2O_7 \cdot 10H_2O$ | 0.40 part (0.90 millimol) |
| $Na_2B_4O_7 \cdot 5H_2O$ | 0.30 part (1.03 millimols) |

Polymerization was carried out at −10° C. as in the preceding runs. A conversion of 67.9 per cent was obtained in 15.5 hours.

In both cases where the activator contained sodium tetraborate the latex was fluid, the fluidity being greater in the run containing the larger quantity of the tetraborate. In the run without the tetraborate the latex set up tightly. The tetraborate-containing activators appeared more stable to air oxidation than the control.

Example IV

The following recipe was employed for carrying out a butadiene-styrene copolymerization at −10° C.

| | Parts by weight |
|---|---|
| Butadiene | 70 |
| Styrene | 30 |
| Water | 192 |
| Methanol | 48 |
| Potassium laurate (95% neutralized) | 5.0 |
| Mercaptan blend[1] | 0.25 |
| Cumene hydroperoxide | 0.084 (0.55 millimol) |
| Activator solution: | |
| Ferrous sulfate, $FeSO_4 \cdot 7H_2O$ | 0.139 (0.50 millimol) |
| Sodium pyrophosphate, $Na_4P_2O_7 \cdot 10H_2O$ | 0.223 (0.50 millimol) |
| Potassium chloride | 0.44 |

[1] A mixture of $C_{12}$, $C_{14}$, and $C_{16}$ tertiary aliphatic mercaptans in the ratio of 3:1:1 parts by weight.

The activator composition was prepared by dissolving 0.556 g. $FeSO_4 \cdot 7H_2O$, 0.894 g. $Na_4P_2O_7 \cdot 10H_2O$ and 1.77 g. KCl in water sufficient to make 100 ml. of solution and heating the resulting mixture at 60° C. for 40 minutes. 25 ml. of this composition was required to contain the requisite amounts of the several ingredients. Polymerization was effected according to the conventional procedure. A parallel run was made using the same recipe except that potassium chloride was omitted from the activator composition.

Two additional runs were made using the same polymerization recipe except that 6.5 parts potassium laurate was used instead of 5.0 parts. In one case 0.44 part potassium chloride was present in the activator composition while in the other case the potassium chloride was omitted.

The results of the four runs are tabulated below:

| K laurate (parts) | KCl (parts) | Conversion (percent) at— | | | | |
|---|---|---|---|---|---|---|
| | | 2.3 hrs. | 5.3 hrs. | 7.4 hrs. | 10.2 hrs. | 23.4 hrs. |
| 5 (control) | none | 12 | 21 | 25 | 31 | 41 |
| 5 | 0.44 | 10 | 28 | 40 | 56 | 84 |
| 6.5 | none | 13 | 26 | 33 | 37 | 45 |
| 6.5 | 0.44 | 12 | 33 | 47 | 63 | 85 |

In the runs containing potassium chloride in the activator system, the conversion curves are closely linear up to 60 per cent conversion. The soap concentration has no influence on the tendency of the reaction to die out at low initiator levels. The addition of 0.44 part potassium chloride prevents the reaction from dying out at both soap levels.

Example V

The recipe of Example IV was employed with the following variations: Run I, no KCl present; run II, 0.40 part KCl added to the soap solution; run III, 0.40 part KCl present in the activator composition. The following time-conversion data were obtained:

| Run No. | Conversion (percent) at— | | | | |
|---|---|---|---|---|---|
| | 2.5 hrs. | 4.2 hrs. | 7.6 hrs. | 10.5 hrs. | 23.8 hrs. |
| I | 10 | 23 | 30 | 36 | 45 |
| II | 13 | 25 | 30 | 32 | 41 |
| III | 11 | 27 | 42 | 55 | 83 |

These results show that the KCl must be present as an ingredient of the activator composition if the desirable result of having reaction proceed to a high conversion in short time is to be fully realized.

Example VI

The following recipe was used for the copolymerization of butadiene with styrene at −10° C.

| | Parts by weight |
|---|---|
| Butadiene | 70 |
| Styrene | 30 |
| Water | 192 |
| Methanol | 48 |
| Potassium laurate (95% neutralized) | 5.0 |
| Mercaptan blend[1] | 0.2 |
| Cumene hydroperoxide | 0.034 (0.22 millimol) |
| Activator solution: | |
|   Ferrous sulfate, $FeSO_4 \cdot 7H_2O$ | 0.056 (0.2 millimol) |
|   Sodium pyrophosphate $Na_4P_2O_7 \cdot 10H_2O$ | 0.089 (0.2 millimol) |
|   Potassium chloride | 0.4 |

[1] See Example IV

The activator composition was prepared according to the procedure given in Example IV by heating an aqueous solution of the ingredients at 60° C. for 40 minutes. Concentrations of the materials were so adjusted that 25 ml of the activator mixture contained the quantities of the separate compounds listed in the recipe. A 62 per cent conversion was obtained in 21 hours. The product had a Mooney value of 54. The iron content of the rubber was 0.013 per cent.

Example VII

Several polymerization runs were made to illustrate the effect of various methods of adding potassium chloride. The recipe of Example IV was used with 0.4 part KCl The following results were obtained:

| Method of adding KCl | Percent Conversion at— | |
|---|---|---|
| | 5.1 hrs. | 24.5 hrs. |
| In $FeSO_4$ soln., then add $Na_4P_2O_7$ | 24 | 84 |
| In $Na_4P_2O_7$ soln., then add $FeSO_4$ | 24 | 84 |
| In $Na_4P_2O_7 \cdot FeSO_4$ complex | 26 | 81 |
| In soap | 21 | 43 |
| Added to reactor after activator soln | 23 | 45 |
| Added to reactor before activator soln | 24 | 44 |
| No KCl | 22 | 47 |

Example VIII

Two polymerization runs were made at −10° C. using the recipe of Example IV. In one case 0.4 part KCl was added to the ferrous sulfate-sodium pyrophosphate solution before heating (run I) while in the other the KCl was added after the ferrous sulfate-sodium pyrophosphate solution had been heated and cooled (run II). The following time-conversion data were obtained.

| Run | Percent Conversion at— | | | | |
|---|---|---|---|---|---|
| | 2.5 hrs. | 5.4 hrs. | 7.2 hrs. | 10.3 hrs. | 24.0 hrs. |
| I | 10 | 26 | 37 | 54 | 82 |
| II | 11 | 23 | 29 | 34 | 41 |

These results show that the presence of KCl in the activator during heating influences the structure or composition of the ferrous pyrophosphate complex in such a way as to improve its efficiency as a polymerization initiator.

Example IX

The recipe of Example IV was followed for carrying out two polymerization runs at −10° C. except that in one case 0.25 part sodium benzoate was substituted for the potassium chloride and in the other case 0.15 part potassium tartrate was used. The results were as follows:

| Electrolyte | Conversion (percent) at— | | |
|---|---|---|---|
| | 7.0 hrs. | 10.5 hrs. | 23.2 hrs. |
| Soldium benzoate | 34.3 | 46.2 | 67.7 |
| Potassium tartrate | 33.2 | 50.9 | 77.6 |
| None | 23.9 | 26.1 | 31.9 |

Example X

Sodium salicylate (0.20 part) was substituted for potassium chloride in the recipe of Example IV and polymerization carried out as before at −10° C. The following results, together with those obtained from a control run in which the electrolyte was omitted, were obtained:

|  | Conversion (percent) at— | |
| --- | --- | --- |
|  | 7.5 hrs. | 23.2 hrs. |
| Sodium Salicylate | 33.2 | 64.7 |
| Control | 24.9 | 32.3 |

An additional run using 0.25 part sodium formate instead of potassium chloride gave a 39.3 per cent conversion in 7.5 hours and at the end of 23.2 hours a conversion of 75.5 per cent was reached.

*Example XI*

Sodium fluoride (0.25 part) was substituted for potassium chloride in the recipe of Example IV and the polymerization carried out at —10° C. A conversion of 42 per cent was obtained in 7.4 hours and when the reaction was allowed to continue for 23.4 hours a conversion of 82 per cent was reached.

*Example XII*

Two polymerization runs were made at —10° C. using the recipe of Example IV except that sodium sulfate was substituted for the potassium chloride, 0.25 part being used in one case and 0.40 part being used in the other. The following results were obtained:

| Sodium Sulfate (parts) | Conversion (percent) at— | | | | |
| --- | --- | --- | --- | --- | --- |
|  | 2 hrs. | 5 hrs. | 7 hrs. | 10.5 hrs. | 24 hrs. |
| 0.25 | 9 | 28 | 37 | 52 | 75 |
| 0.40 | 9 | 24 | 38 | 58 | 83 |

In a third run using 0.75 part sodium sulfate, considerable retardation was observed. The reaction did not die out but a conversion of only 36 per cent was reached in 24 hours.

*Example XIII*

Variable amounts of sodium and potassium chloride were employed in a series of polymerization runs at —10° C. using the recipe of Example IV. The time-conversion data obtained were as follows:

| Electrolyte | Conversion (percent) at— | | | | |
| --- | --- | --- | --- | --- | --- |
|  | 2.5 hrs. | 5.2 hrs. | 7.0 hrs. | 10.6 hrs. | 23.5 hrs. |
| NaCl, 0.10 part | 14 | 27 | 36 | 48 | 62 |
| NaCl, 0.25 part | 16 | 28 | 37 | 55 | 77 |
| NaCl, 0.40 part | 11 | 25 | 36 | 55 | 86 |
| NaCl, 0.75 part | 1 | 3 | 4 | 8 | 7 |
| NaCl, 1.00 part | 0 | 0 | 0 | 1 | 4 |
| KCl, 0.10 part | 10 | 26 | 37 | 54 | 75 |
| KCl, 0.25 part | 11 | 28 | 39 | 59 | 80 |
| KCl, 0.40 part | 11 | 29 | 40 | 53 | 82 |
| KCl, 0.75 part | 11 | 30 | 41 | 60 | 85 |
| KCl, 1.00 part | 12 | 30 | 42 | 59 | 86 |

The results show that sodium chloride exerts an optimum effect at about 0.4 part while with potassium chloride about equal effects are produced over the range from 0.25 to 1.00.

*Example XIV*

Variable amounts of potassium chloride were employed in a series of polymerization runs at —10° C. using the recipe and procedure of Example VI. The following results were obtained:

| KCl, parts | Conversion (percent) at— | |
| --- | --- | --- |
|  | 16.3 hrs. | 23.4 hrs. |
| 0.25 | 36 | 41 |
| 0.40 | 43 | 51 |
| 0.75 | 51 | 60 |
| 1.00 | 52 | 63 |
| 1.50 | 53 | 66 |

*Example XV*

The copolymerization of butadiene with styrene was carried out at 5° C. according to the following recipe:

|  | Parts by weight |
| --- | --- |
| Butadiene | 72 |
| Styrene | 28 |
| Water | 180 |
| Tetrahydroabietic acid, potassium salt | 4.7 |
| Cumene hydroxide | Variable |
| Mercaptan blend [1] | 0.25 |
| Ferrous sulfate, $FeSO_4.7H_2O$ | Variable |
| Potassium pyrophosphate, $K_4P_2O_7$ | Variable |
| Potassium hydroxide | 0.1 |
| Potassium chloride | 0.5 |
| Dextrose | 1.0 |

[1] See Example IV.

Variations in the initiator ingredients were shown as in the following table.

| Run No. | Cumene Hydroperoxide | | $FeSO_4.7H_2O$ | | $K_4P_2O_7$ | | Hrs. to 60% Conv. |
| --- | --- | --- | --- | --- | --- | --- | --- |
|  | Parts | Millimols | Parts | Millimols | Parts | Millimols |  |
| I | 0.05 | 0.32 | 0.07 | 0.25 | 0.08 | 0.25 | 11 |
| II | 0.03 | 0.23 | 0.05 | 0.18 | 0.06 | 0.18 | 11 |
| III | 0.02 | 0.14 | 0.03 | 0.11 | 0.036 | 0.11 | 13 |
| IV | 0.01 | 0.08 | 0.017 | 0.06 | 0.02 | 0.06 | 15 |

The potassium salt of tetrahydroabietic acid and 0.06 part of the potassium hydroxide are dissolved together for the preparation of the emulsifier solution. For the preparation of the activator solution the dextrose and the remainder of the potassium hydroxide (0.04 parts) are dissolved together in 10 parts water and heated to 71° C. for 10 minutes. The ferrous sulfate, potassium pyrophosphate, and potassium chloride are dissolved in 10 parts water and the mixture warmed while being mildly agitated after which it is cooled to room temperature. When the dextrose solution has cooled to room temperature, it is added to the ferropyrophosphate solution.

For carrying out the polymerization, the emulsifier solution was charged to the reactor after which the activator solution was added. The mercaptan, dissolved in 90 per cent of the styrene, was then introduced followed by the butadiene. The contents of the reactor were brought to a temperature of 5° C. after which the cumene hydroperoxide was introduced followed by a rinse with the remaining 10 per cent of the styrene. Polymerization was effected at 5° C. according to the conventional technique. The results obtained are shown in the table.

*Example XVI*

The recipe of Example VI was followed for carrying out a polymerization reaction at —10° C. except that the potassium salt of tetrahydroabietic acid was employed as the emulsifying agent. At the end of 13 hours the conversion had reached 13.4 per cent.

A similar run was made in which the amounts of the initiator ingredients were varied as follows:

|  | Parts by weight |
|---|---|
| Cumene hydroperoxide | 0.06 (0.40 millimol) |
| Ferrous sulfate, $FeSO_4.7H_2O$ | 0.10 (0.36 millimol) |
| Sodium pyrophosphate, $Na_4P_2O_7.10H_2O$ | 0.16 (0.36 millimol) |

A conversion of 31.4 per cent was reached in 13 hours.

As will be evident to those skilled in the art, various modifications of this invention can be made, or followed, in the light of the foregoing disclosure and discussion, without departing from the spirit or scope of the disclosure or from the scope of the claims.

We claim:

1. A process for polymerizing an organic monomeric material comprising an unsaturated organic compound containing a $CH_2=C<$ group while dispersed in an aqueous medium, which comprises polymerizing such a monomeric material while dispersed in an aqueous medium in the presence of an oxidant and in the presence of an activator composition prepared by dissolving in water a salt of a multivalent metal capable of existing in two valence states under such conditions that it is present at least in part in a lower valence state together with a pyrophosphate of a monovalent cation selected from the class consisting of alkali metals and ammonium and with a different salt of a monovalent cation selected from the class consisting of alkali metals and ammonium and an anion which is inert with respect to said multivalent metal, heating said solution out of contact with free oxygen to a temperature between 40 and 100° C. for 5 to 90 minutes and subsequently cooling the resulting solution, and so incorporating said solution in said polymerization along with said oxidant that there is added, based upon 100 parts by weight of said monomeric material, 0.01 to 3 millimol parts of said multivalent metal, pyrophosphate and oxidant and 0.1 to 5 parts of said different salt.

2. The process of claim 1 in which said different salt is a sulfate.

3. The process of claim 1, in which said different salt is a tartrate.

4. The process of claim 1 wherein said polymerization is conducted below 0° C. in the presence of an organic hydroperoxide as said oxidant.

5. The process of claim 1 in which said different salt is a fluoride of an alkali metal.

6. The process of claim 1 in which said different salt is a chloride of an alkali metal.

7. The process of claim 1 in which said different salt is a tetraborate of an alkali metal.

8. An improved process for producing synthetic rubber, which comprises polymerizing a monomeric material comprising 1,3-butadiene while dispersed in an aqueous emulsion in the presence of dimethyl(phenyl)hydroperoxymethane as an oxidant and in the presence of an activator composition prepared by dissolving in water ferrous sulfate, sodium pyrophosphate and potassium chloride, heating said solution out of contact with free oxygen to a temperature between 50 and 80° C. for a period of 5 to 90 minutes and cooling said solution, and adding the cool solution to the reaction mixture, the amount of said activator composition added and the amount of said constituents present therein being such that, per 100 parts by weight of said monomeric material, there is added 0.1 to 0.65 millimol parts each of ferrous sulfate, sodium pyrophosphate and separately added dimethyl(phenyl) hydroperoxymethane and 0.1 to 5 parts of potassium chloride.

9. In the catalytic polymerization of a liquid monomeric material comprising a conjugated diolefin while dispersed in an aqueous emulsion in which a polymerization catalyst is used comprising an oxidant and an iron pyrophosphate activator composition, the improvement which comprises using as an activator composition comprising said iron pyrophosphate an aqueous solution prepared by dissolving in water a soluble iron salt under conditions such that at least part of said iron is present in the ferrous state, a pyrophosphate of a monovalent cation selected from the class consisting of alkali metals and ammonium, and a different salt of a monovalent cation selected from the class consisting of alkali metals and ammonium and an anion which is inert with respect to ferrous and ferric ions, heating said solution out of contact with an oxidizing atmosphere to a temperature between 40 and 100° C. for 5 to 90 minutes and subsequently cooling the resulting solution, and so incorporating said solution in said aqueous emulsion along with said oxidant that there is added, based upon 100 parts by weight of said monomeric material, 0.01 to 3 millimol parts of iron, pyrophosphate, and oxidant and 0.1 to 5 parts of said different salt.

10. In the catalytic polymerization of a monomeric material comprising a conjugated diolefin while dispersed in an aqueous emulsion in which a polymerization catalyst is used comprising an oxidant and a pyrophosphate of a multivalent metal capable of existing in two valence states as an activator composition, the improvement which comprises using as said activator composition an aqueous solution prepared by dissolving in water a pyrophosphate of a monovalent cation selected from the class consisting of alkali metals and ammonium, a salt of such a multivalent metal under conditions such that it is present at least in part in a lower valence state, and a different salt of a monovalent cation selected from the class consisting of alkali metals and ammonium and an anion which is inert with respect to said multivalent metal ion, heating said solution out of contact with free oxygen to a temperature between 40 and 100° C. for 5 to 90 minutes and subsequently cooling the resulting solution, and so incorporating said solution in said polymerization along with said oxidant that there is added, based upon 100 parts by weight of said monomeric material, 0.01 to 3 millimol parts of said multivalent metal, pyrophosphate and oxidant and 0.1 to 5 parts of said different salt.

11. The process of claim 10, wherein said oxidant is an organic hydroperoxide, said multivalent metal is iron and is added to said activator solution as a ferrous salt in the absence of any reductant, and said activator composition and oxidant are separately added to said polymerization in such amounts that there are equimolar amounts of iron and pyrophosphate and a molar excess of said oxidant over said iron.

12. An improved method of preparing a solution of iron pyrophosphate, which can be used as an activator solution in the polymerization of a conjugated diolefin while dispersed in an aqueous solution in the presence of an oxidant, which comprises dissolving in water a soluble ferrous salt and a soluble pyrophosphate in equimolar amounts and a salt of a monovalent cation selected from the class consisting of alkali metals and ammonium and an anion which is inert with respect to ferrous and ferric ions, each in an amount between 0.5 and 5 parts by weight per 100 parts of water, and heating the resulting solution to a temperature between 40 and 100° C. for 5 to 90 minutes out of contact with free oxygen.

13. An improved method of preparing a solution of a pyrophosphate of a multivalent metal capable of existing in two valence states selected from the group consisting of iron, manganese, copper, vanadium and cobalt and which can be used as an activator solution in the polymerization of a conjugated diolefin while dispersed in an aqueous emulsion in the presence of an oxidant, which comprises dissolving in water a salt of said multivalent metal, capable of existing in two valence states and under such conditions that it is present at least in part in a lower valence state, a soluble pyrophosphate in an amount at least stoichiometrically equivalent to said multivalent metal, and a different salt of a monovalent cation selected from the class consisting of alkali metals and ammonium and an anion which is inert with respect to said multivalent metal, each in an amount between 0.5 and 5 parts by weight per 100 parts of water, and heating the resulting solution to a temperature between 40 and 100° C. for 5 to 90 minutes out of contact with an oxidizing atmosphere.

14. The method of claim 13 wherein said multivalent metal is iron, and said heating is at a temperature between 50 and 80° C. for 20 to 40 minutes.

15. As a composition of matter, an iron pyrophosphate solution prepared by dissolving in water a ferrous salt and at least an equimolar amount of a pyrophosphate and a different salt of a monovalent cation selected from the class consisting of alkali metals and ammonium and an anion inert with respect to ferrous and ferric ions, with an amount of each between 0.5 and 5 parts by weight per 100 parts of water, and heating said solution to 40 to 100° C. for 5 to 90 minutes out of contact with free oxygen.

16. The composition of claim 15 wherein said different salt is a fluoride.

17. The composition of claim 15 wherein said different salt is a tetraborate.

18. The composition of claim 15 wherein said different salt is a chloride.

19. The composition of claim 15 wherein said different salt is a sulfate.

20. The composition of claim 15 wherein said different salt is a tartrate.

CARL A. URANECK.
WILLARD M. ST. JOHN.
CHARLES F. FRYLING.
JAMES E. TROYAN.

REFERENCES CITED

The following references are of record in the file of this patent:

UNITED STATES PATENTS

| Number | Name | Date |
|---|---|---|
| 2,366,328 | Fryling | Jan. 2, 1945 |
| 2,367,877 | Layng | Jan. 23, 1945 |
| 2,380,614 | Semon | July 31, 1945 |
| 2,471,938 | Crouch et al. | May 31, 1949 |

OTHER REFERENCES

Vanderberg et al.: Ind. & Eng. Chem., vol. 40, No. 5, May 1948, pp. 932–937.

Shearon, Jr., et al.: Ind. & Eng. Chem., vol. 40, No. 5, May 1948, pp. 769–777.

Merck's Index, 4th ed., Merck and Co., New Jersey (1930), page 281.